March 2, 1965  D. B. LEVINS  3,171,280
MASS FLOWMETER
Original Filed May 21, 1959  3 Sheets-Sheet 1
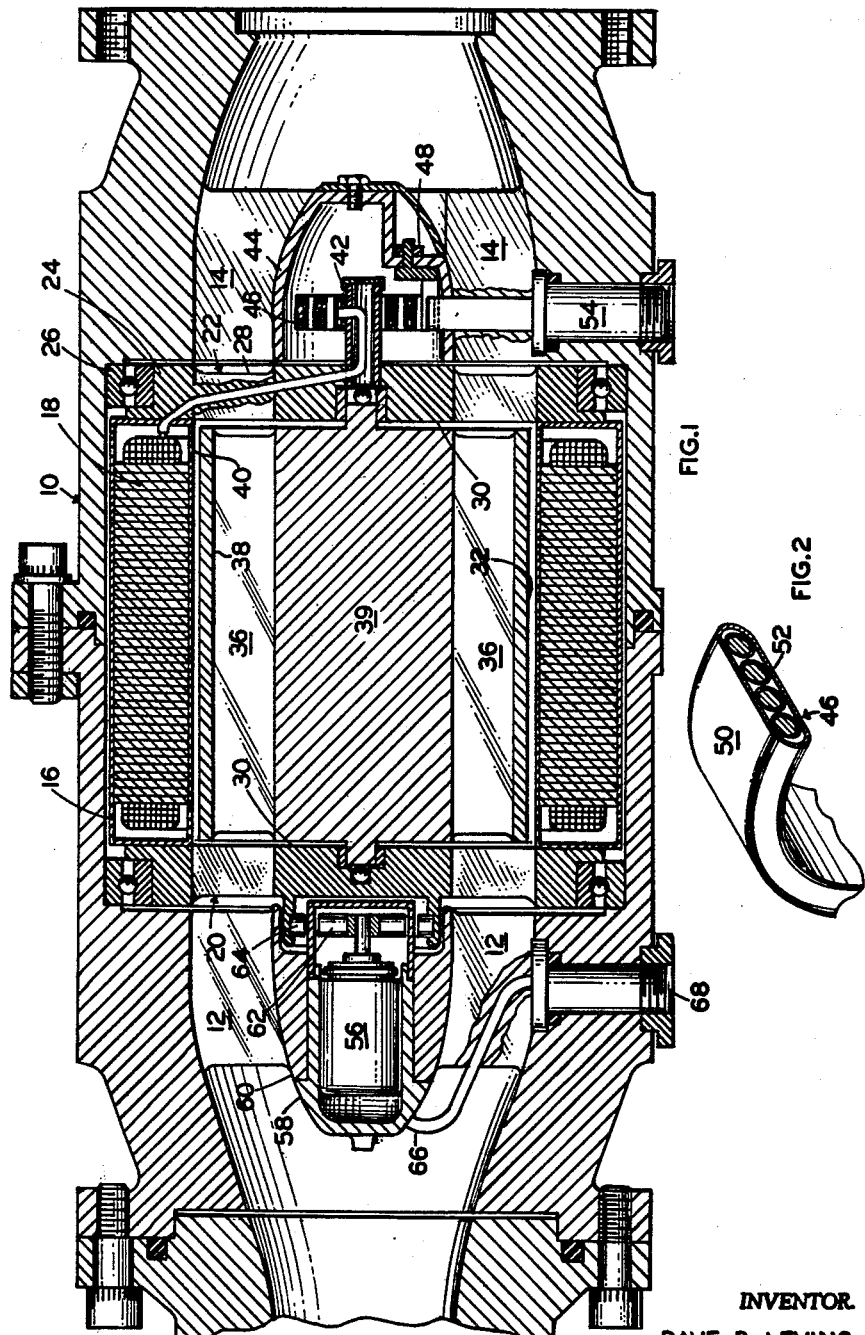
INVENTOR.
DAVE B. LEVINS
BY Richard E. Hosley
HIS ATTORNEY March 2, 1965

D. B. LEVINS 3,171,280

MASS FLOWMETER

Original Filed May 21, 1959

INVENTOR.
DAVE B. LEVINS
BY *Richard E. Hosley*
HIS ATTORNEY

March 2, 1965
D. B. LEVINS
3,171,280
MASS FLOWMETER
Original Filed May 21, 1959
3 Sheets-Sheet 3
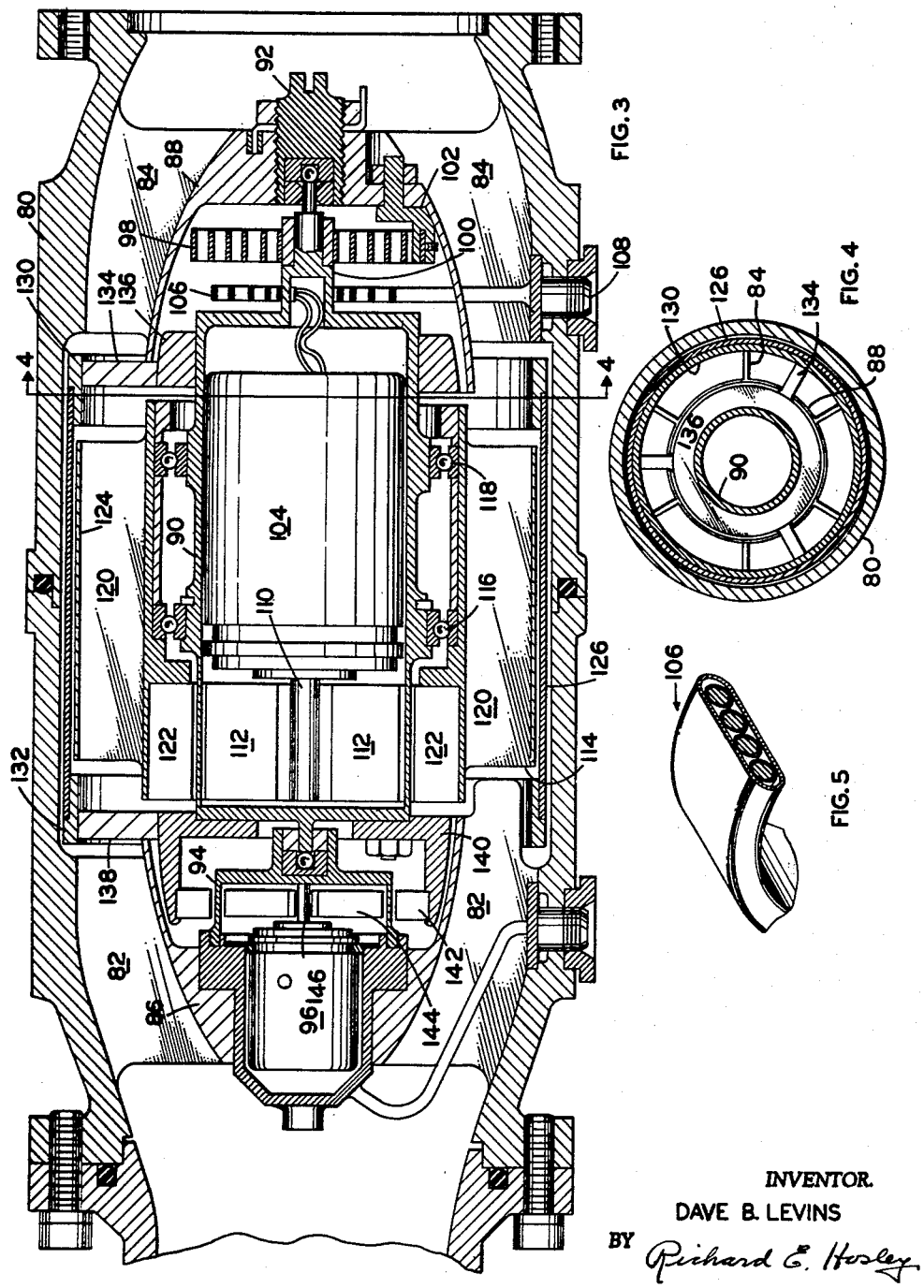
INVENTOR.
DAVE B. LEVINS
BY *Richard E. Hosley*
HIS ATTORNEY United States Patent Office 3,171,280
Patented Mar. 2, 1965

3,171,280
MASS FLOWMETER
Dave B. Levins, Swampscott, Mass., assignor to General
Electric Company, a corporation of New York
Original application May 21, 1959, Ser. No. 814,803, now
Patent No. 3,056,292, dated Oct. 2, 1962. Divided
and this application Jan. 2, 1962, Ser. No. 163,392
8 Claims. (Cl. 73—194)

This invention relates to fluid mass flowmeters and, more particularly, to novel improvements in fluid mass flowmeters of the single element angular momentum type. The subject application is a division of application Serial No. 814,803 filed May 21, 1959 now Patent No. 3,056,-292.

If all, or substantially all, of a fluid flowing in a pipe or conduit is accelerated to a uniform velocity and in a given direction other than that of the normal flow direction by means of a member driven at a substantially constant speed, the momentum of the fluid in the given direction of such acceleration will be directly proportional to the mass of the fluid accelerated. This is true inasmuch as the momentum of the fluid is equal to a constant times the mass of the fluid accelerated times the velocity to which the fluid is accelerated; and, thus, if the final velocity of the accelerated fluid is maintained at a constant value, it can be seen that the momentum of the fluid will vary directly with the mass of the fluid being accelerated. The measurement of this momentum imparted to the fluid may be obtained through the use of a resiliently restrained reaction member such as a turbine disposed closely adjacent the fluid accelerating member to absorb the momentum imparted to the fluid by the accelerating member, which might be a rotatable impeller. Such a flowmeter having a rotatable impeller and associated turbine may be referred to as a two element angular momentum type flowmeter, and such a flowmeter is described and claimed in United States Patent No. 2,714,-310, issued August 2, 1955, in the name of Frederic B. Jennings, the assignee of this patent also being the assignee of the present invention.

Another type of flowmeter for determining the mass flow of a fluid is disclosed in copending United States patent application Serial No. 768,798, filed October 22, 1958, in the name of Philip K. Bodge now Patent No. 3,056,291, this application also being assigned to the assignee of the present invention. In one embodiment of the invention of this copending application, a resiliently restrained deflectable member for sensing the fluid momentum torque imparted by the impeller is an element of a drive gear train to the fluid accelerating impeller. More specifically, the deflecting member is the sun gear of a planetary drive gear train to the impeller, with the torque to the impeller being sensed by the deflection of the sun gear. The input torque to the impeller is, of course, a function of the momentum torque imparted to the fluid by the impeller, and thus, in this particular flowmeter, the necessity for a separate turbine is eliminated. The resulting structure may be referred to as a single element flowmeter. This type is readily adapted for measuring flow in either direction through the flowmeter in addition to measuring flow in one direction only as in the case of the two element flowmeter.

Another means of determining the impeller-imparted momentum to fluid within a single element flowmeter is taught in United States Patent No. 2,814,949, issued December 3, 1957, in the name of Philip K. Bodge. In this last-mentioned patent, the drive motor for a fluid accelerating impeller is provided with what may be called a dynamometer mounting so that deflections of the motor stator, which of course, are proportional to the impeller torque, may be utilized to provide a measurement of the momentum torque imparted to the fluid.

In flowmeters of the type described above, it is usual for the fluid accelerating member to pass closely adjacent the inner walls of the housing for the flowmeter to assure that all or substantially all of the fluid passing through the flowmeter will be accelerated by the impeller. It will be apparent that the total torque applied to the impeller will include not only the torque required to impart the desired acceleration to the fluid but also certain error torques resulting from viscous shear of the fluid by the impeller as well as from friction associated with the bearings rotatably supporting the impeller. In a two element flowmeter such as described, these error torques on the impeller are, of course, not transmitted to the turbine, and, therefore, the turbine senses only the momentum torque of the fluid. Thus, a two element flowmeter of the type described in the Jennings patent may be said to be insensitive to viscous errors or any losses in the impeller drive system. However, it has been found that in the case of a single element flowmeter of the general types described above the viscous and bearing error torques may affect the accuracy of the flowmeter to an undesirable extent. More specifically, it has been found that the total torque required to be applied to the impeller to overcome the resistance offered by the viscous and friction error torques can be of such a magnitude as compared to the momentum torque, which it is desired to measure, that the total torque required to drive the impeller is no longer a sufficiently accurate measurement of the momentum torque.

Accordingly, it is the primary object of this invention to provide a single element fluid mass flowmeter of the angular momentum type having a sensing member on which is exerted torques directly proportional to the total torques applied to a fluid accelerating impeller within the flowmeter, with viscous and/or friction error torque eliminating means acting on the sensing member so that the resultant net torques thereon will be directly proportional to the momentum torque imparted to fluid by the impeller.

It is another object of this invention to provide a single element fluid mass flowmeter of the type described having novel and improved construction whereby the deflection of a deflectable stator of an electric motor drivingly connected to a fluid accelerating impeller within the flowmeter will provide an improved accuracy of representation of the mass flow of the fluid accelerated by the impeller.

Other objects and advantages of this invention will be apparent from the following description of specific embodiments of the invention when taken in connection with the accompanying drawings illustrating these embodiments and in which:

FIG. 1 is a longitudinal cross sectional view of a single element angular momentum type fluid mass flowmeter embodying the present invention;

FIG. 2 is an enlarged sectional view of a portion of the flowmeter of FIG. 1;

FIG. 3 is a longitudinal cross sectional view of an alternative construction of a flowmeter embodying the present invention;

FIG. 4 is a reduced cross sectional view substantially along the line 4—4 of FIG. 3;

FIG. 5 is an enlarged sectional view of a portion of the flowmeter of FIG. 3;

Figure 6:
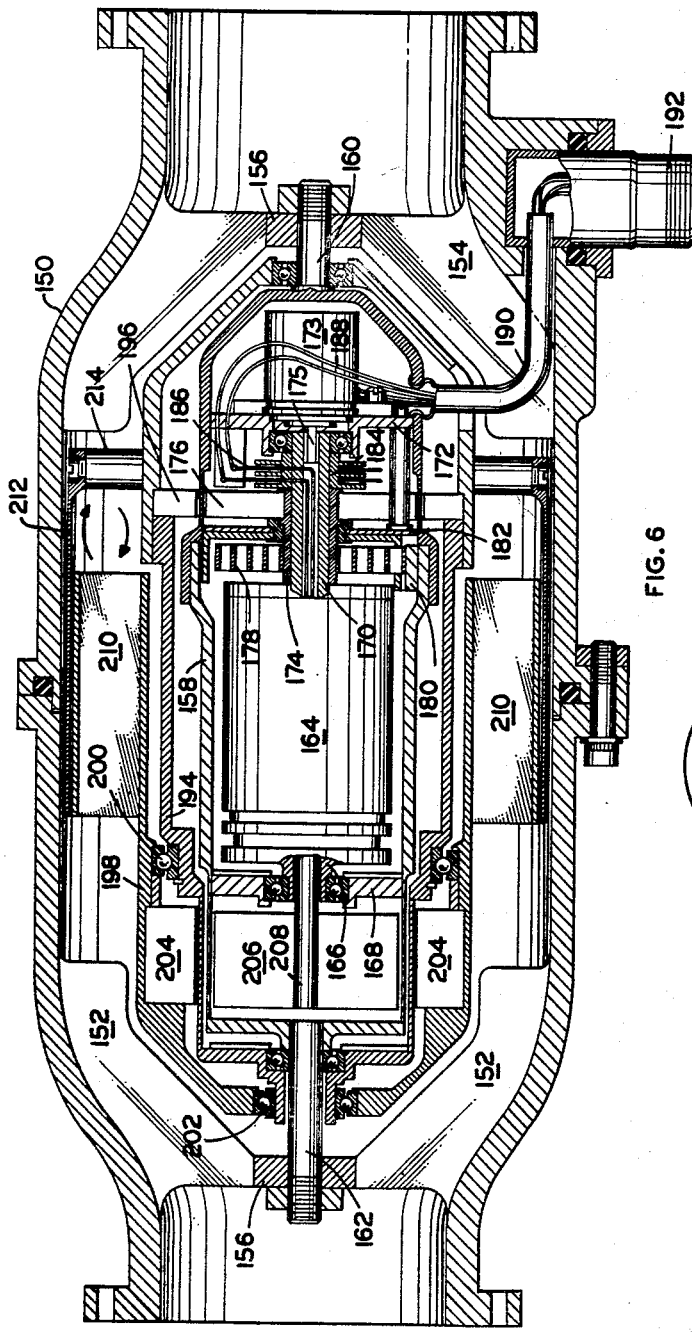
FIG. 6 is a longitudinal cross sectional view of an alternative construction of a flowmeter embodying the present invention.

Briefly, in its primary aspect, this invention may be described as contemplating a single element fluid mass flowmeter of the angular momentum type having a fluid accelerating member confined within a conduit with means for driving the accelerating member. The driving means for the accelerating member includes a deflecting member which is constructed and arranged to be deflectable in one direction by an amount directly proportional to the total power or torque applied to the accelerating member. In accordance with the invention, there is provided a viscous error eliminating member constructed and arranged relative to the accelerating member so as to be responsive to the viscous torque acting on the accelerating member and so as to reflect this error torque directly to the deflectable member in a manner tending to move the same in a direction opposite said one direction of movement thereof. Accordingly, the net resultant movement of the deflectable member in said one direction will represent the momentum torque imparted to the fluid by the accelerating member without including the viscous error torque. A description of other aspects of the invention as well as a more detailed description of the aforedescribed primary aspect is provided hereinafter.

A specific structural embodiment of a flowmeter incorporating this invention is shown in FIG. 1, wherein the flowmeter is of the axial flow single element angular momentum type and comprises a generally cylindrical diametrically split housing 10 having a fluid flow passage extending longitudinally therethrough and with means at opposite ends of the housing for coupling the same in a fluid conduit. A plurality of circularly arranged flow straightening vanes or struts 12 and 14 are arranged concentrically within the housing adjacent the opposite ends respectively thereof. The longitudinal bore of the housing is enlarged in the center portion of the housing to accommodate an annular fluid tight casing 16 enclosing the stator 18 of an electric motor. The stator casing 16 is fixedly mounted to supporting members 20 and 22 disposed at the opposite ends respectively of the casing and each comprising an outer annular portion or ring 24 secured to the casing 16 and carrying the inner race of a bearing 26, the outer race of which is mounted on the housing 10. A plurality of circularly arranged webs or struts 28 extend radially inwardly from each ring 24 and terminate in a boss 30 disposed generally coaxially of the bore through the housing 10.

Disposed coaxially within the stator casing 16 is a rotor 32 for the stator 18 with the rotor, in accordance with one aspect of the invention, also forming a fluid accelerating impeller for the flowmeter. The impeller-rotor comprises a hub or shaft portion 39 extending coaxially of the housing 10 and rotatably mounted at its opposite ends in bearings supported by the bosses 30 of the stator support members 20 and 22. The impeller further comprises a plurality of walls or partitions 36 extending radially outwardly of the hub 39 and parallel to the longitudinal axis of the hub, with the walls 36 being angularly spaced about the axis of the impeller. In the specific embodiment shown, a cylindrical permanent magnet, having a plurality of poles angularly spaced about its periphery, surrounds the radial walls 36 to define an outer cylindrical wall 38 which in cooperation with the walls 36 and hub 39 forms a plurality of circularly arranged linear flow passages arranged concentrically of the throughbore in the housing 10. These linear flow passages are spaced radially outwardly equidistant from the axis of the impeller and extend parallel to the longitudinal axis of the throughbore and the housing 10. It will be particularly observed that the inner wall 40 of the stator casing 16 and the outer surface of the outer wall 38 of the impeller are arranged next adjacent each other in closely spaced relation so that the wall 40 forms a shroud around the impeller.

The boss 30 of the stator support 22 is provided with a coaxial extension 42 projecting toward the next adjacent end of the housing 10 and into an enclosure formed by a streamlined housing 44 supported centrally of the throughbore in the housing 10 by the flow straighteners 14. A coil spring 46 is disposed within the housing 44 and arranged about the extension 42, with the inner end of the spring fixed to the extension. The outer end of the spring is fixed to the housing 44 by a spring clamp 48, whereby deflection of the stator 18 about the axis of the impeller will be resiliently restrained by the spring 46.

In accordance with the invention, and as best shown in FIGS. 1 and 2, the spring 46 comprises an elongated, imperforate flattened tubular member 50 fabricated from a resilient material, having the desired spring characteristics. Disposed within the spring 50 are a plurality of electrical leads 52, which, as shown in FIG. 1, extend out of the inner end of the spring and through the stator support 22 and are connected to the motor stator 18. The outer end of the spring 46 extends beyond the spring clamp 48 and through one of the flow straighteners 14 to an electrical connector 54 opening outwardly of the housing 10 for connection of the motor stator to a source of current. Thus, in accordance with the invention, the spring 46 not only serves to provide the sole resilient restraining force on the stator 18 but also serves to provide a fluid-tight conduit for carrying the electrical leads to the stator.

The deflections of the motor stator 18 about the axis of the impeller 39 are sensed by a pickoff 56, such as a synchro, enclosed within a housing 58 supported coaxially of the throughbore in the housing 10 by a boss 60 centrally supported by the flow straighteners 12. The pickoff 56 is provided with a movable member having secured thereto a plurality of magnets 62 disposed within the casing 58. A plurality of magnets 64 are mounted for movement with the stator support 20 and cooperate with the magnets 62 to effect a corresponding movement of the movable member of the pickoff 56 to provide an electrical signal through leads within a conduit 66 leading to a connector 68 on the housing 10. The signal from the pickoff is, of course, representative of the position of the stator 18.

Figure 7:
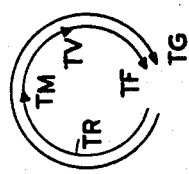
FIG. 7 is a diagrammatic representation of the torques acting upon the impeller of the flowmeter of FIG. 1.

In the use of a flowmeter as just described, the housing 10 may be connected in a fluid conduit with the fluid flowing into either end of the housing 10. Energizing of the drive motor of the flowmeter will cause a corresponding rotation of the rotor-impeller 32 to angularly accelerate substantially all of the fluid flowing through the housing to a uniform velocity about the axis of the impeller. The torque applied to the rotor by the stator across the gap therebetween is reflected at the stator as a torque tending to rotate the stator in a direction opposite the direction of rotor movement. As a result, the stator will be deflected in such direction a limited amount as determined by the spring 46. There are, of course, certain friction forces associated with the bearings for the rotor tending to resist rotation thereof. Further, the rotation of the rotor-impeller within a fluid filled housing also results in viscous shear forces acting upon the rotor and tending to resist rotation thereof. These friction forces and viscous shear forces are reflected in the rotor-impeller as error torques and are additive to the torque required to accelerate the fluid. Inasmuch as the rotor is preferably driven at a substantially constant speed, the torque required to accelerate the fluid will vary with the momentum imparted to the fluid, or, in other words, the mass of the fluid being accelerated. Accordingly, the total torque on the rotor is equal to this momentum torque imparted to the fluid plus the friction and viscous error torques. The rotor torque is, of course, of the same level as the torque transmitted across the gap between the stator and the rotor. With reference to FIG. 7, there is diagrammatically illustrated the relationship of these various torques with respect to a clockwise rotating impeller. Thus, as discussed above and as shown in FIG. 7:

(1) $T_R = T_M + T_V + T_F = T_G$ where $T_R$ equals the total torque applied to the rotor; $T_M$ equals the angular momentum imparted to the fluid by the impeller in terms of torque; $T_V$ equals viscous error torque on the rotor; $T_F$ equals friction error torque on the rotor; and $T_G$ equals the total torque across the gap between the rotor and the stator.

Figure 8:
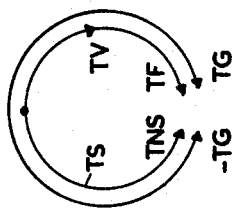
FIG. 8 is a diagrammatic representation of the torques acting upon the stator of the drive motor of the flowmeter of FIG. 1.

It will be apparent from FIG. 1 that the friction forces tending to resist rotation of the rotor also tend to rotate the support for the bearings so as to carry this support with the impeller in the same direction of rotation. Thus, the stator supports 20 and 22 will tend to be rotated with the impeller and being fixed to the stator casing 16 will tend to carry the stator 18 with the impeller. Correspondingly, the viscous forces acting on the impeller will tend to couple the outer surface of the impeller to the inner wall 40 of the stator casing 16 to tend to carry the casing with the impeller. It can thus be seen that the friction and viscous error torques acting on the rotor are transferred back to the deflectable stator casing in the same sense or direction as applied to the rotor. The total torque applied across the gap between the rotor and the stator is, of course, reflected in the stator as an equal and opposite torque, $-T_S$, or, in other words, as can be seen from FIG. 8 which diagrammatically represents the torques acting on the stator casing 16:

(2) $T_G = -T_S = T_V + T_F - T_{NS}$ where $T_{NS}$ is the net torque acting on the stator casing and from (2):

(3) $T_{NS} = T_V + T_F - T_G$ substituting (1) in (3):

(4) $T_{NS} = T_V + T_F - T_M - T_V - T_F = -T_M$ or neglecting the direction of the movement of rotation of the stator casing relative to the rotor:

(5) $T_{NS} = T_M$

Thus, it can be seen that the net torque acting on the stator casing 16 is effectively only that represented by the momentum torque imparted to the fluid by the rotor-impeller. The only remaining error in the signal from the flowmeter is that caused by the bearings supporting the deflectable casing 16. However, in practice, this error may be maintained at a very low level by the proper selection of the bearings and also, of course, this error may be easily compensated for. This error is, of course, also present in the two element flowmeter and in any flowmeter in which a deflectable member is used to sense the mass flow.

Turning now to FIGS. 3 and 4, the flowmeter shown therein is of the single element angular momentum type and comprises a diametrically split housing 80 having a through bore for the passage of fluid. At the opposite ends of the housing respectively are a plurality of flow straightening struts 82, 84 centrally supporting a pair of streamlined brackets 86, 88, respectively. A generally cylindrical deflectable fluid-tight motor casing 90 is coaxially received within the housing 80 and mounted in bearings at its opposite ends respectively, with the bearings at one end of the casing being carried by a threaded support 92 extending coaxially of the bracket 88 and with the bearing at the other end being carried by a pickoff housing 94 fixed to the bracket 86 and housing a pickoff 96. A coiled restraining spring 98 is arranged about the shaft extension 100 of the motor casing, with the inner end of the spring being connected to the shaft extension 100 and the outer end of the spring being connected to a spring clamp 102 carried by the bracket 88. Disposed within the casing 90 and fixed to the casing is an electric motor 104. The electrical leads to the motor 104 extend from within the casing 90 into the inner end of a tubular coiled member 106 arranged about the shaft extension 100 with its inner end connected to the extension 100. As most clearly shown in FIG. 5, the tubular coiled member 106 is of a construction generally similar to the spring 46, previously described, whereby the motor leads are led through the member 106 which is connected at its outer end to a connector 108 to which may be connected a suitable source of electrical power for the motor. In the specific embodiment of FIG. 3, the tubular member 106 is fabricated from metal having spring characteristics whereby the member 106, as well as the spring 98, resiliently resists movement of the motor casing 90 about the axis of the housing 80. However, of course, if desired, the spring force of the member 106 could be selected to be sufficiently low that it would not provide any substantial biasing force on the casing 90 but rather the member 106 would be utilized substantially solely as a lead wire conduit for the motor.

The motor 104, which if desired may be a gear motor including a speed change gear train, comprises a stator (not specifically shown) which is fixed for movement with the outer housing for the motor and thus to the casing 90. The motor also includes a rotor (not shown) and a drive shaft 110 extending externally of the motor and to which is mounted a plurality of magnets 112. Disposed coaxially over the casing 90 is a generally cylindrical impeller 114 rotatably mounted on the casing 90 by bearings 116, 118. The impeller 114 is of a construction generally similar to the impeller 32 of the flowmeter of FIG. 1 and thusly includes a plurality of circularly arranged linear flow passages 120 disposed concentrically of the axis of the casing 90 and extending parallel to the casing axis. Mounted on the impeller 114 are a plurality of magnets 122 cooperating with the magnets 112 of the motor 104 to provide for rotation of the impeller in response to energizing of the motor.

Disposed concentrically about the outer wall 124 of the impeller in closely radially spaced relation is a cylindrical shroud 126, the outer surface of which is disposed closely adjacent the inner wall of the housing 80. The shroud is supported at its opposite ends on a pair of annual members or rings 130, 132. The ring 130 is supported by a plurality of angularly spaced, radially extending struts 134 supported at their inner ends on an annular collar 136 disposed telescopically over and fixed to the deflectable casing 90. The ring 132 is similarly supported by a plurality of radially extending angularly spaced struts 138 supported at their inner ends on a shroud support member 140 fixed to the deflectable casing 90. The shroud supporting member 140 also carries a plurality of magnets 142 cooperating with a plurality of magnets 144 disposed within the pickoff housing 94 and connected to a moveable shaft 146 forming a part of the pickoff. Movement of the shaft 146 of the pickoff 96 relative to the pickoff housing will result in an output signal from the pickoff representative of the angular movement of the casing 90.

In the use of the flowmeter of FIG. 3, fluid may be introduced into the flowmeter from either end thereof, and the fluid will be accelerated by the impeller 114 in a manner similar to that described in connection with the flowmeter of FIG. 1. Correspondingly, the torque applied to the impeller 114 by the motor 104 will result in a deflection of the motor casing 90 in a directon opposite to impeller rotation. The bearing error torques resulting from the bearings 116, 118 will, as is apparent from FIG. 3, increase the total power required to drive the impeller and will also be reflected on the casing 90 by a torque tending to rotate the casing in the direction of impeller rotation. The viscous shear forces on the impeller will tend to further increase the power required to rotate the impeller. However, the coupling between the impeller 114 and closely spaced shroud 126 will tend to carry the shroud with the impeller so that the viscous error torque will be transferred through the shroud and its supporting structure directly back to the casing 90 in the same sense or direction as impeller rotation. Accordingly, as in the case of the flowmeter of FIG. 1, the friction and viscous error torques of the impeller are not represented by the deflection of the casing 90 about its axis but rather the torque represented by the deflection of the casing 90 will be effectively only the momentum torque imparted to the fluid by the impeller. Accordingly, the signals from the pickoff 96, which senses the deflection of the casing 90, will not include errors resulting from viscous and friction error torques.

Turning now to FIG. 6, there is shown a further alternative embodiment of a single element angular momentum type flowmeter which comprises a diametrically split housing 150 having a longitudinal throughbore for the passage of fluid through the housing. Disposed adjacent the opposite ends of the housing are angularly spaced, radially inwardly extending flow straightening struts or vanes 152, 154, with each set of vanes terminating centrally of the housing in a boss 156. An elongated hollow motor casing 158 is disposed coaxially within the housing 150, with shaft extensions 160, 162 extending from the opposite ends of the casing 158 and fixedly mounted on the bosses 156. Disposed within the casing 158 is an electric motor 164 which might be a gear motor and which has an outer housing 166 supported at its leftward end by a bearing, the outer race of which is fixed to the fixed casing 158 by means of an annular support 168. A shaft extension 170 extends from the opposite end of the motor housing 166 and is supported at its terminal end in a bearing, the outer race of which is fixedly supported on the fixed casing 158 by a supporting member 172. The support 172 also carries a pickoff 173 having a movable member 175 connected for movement with the shaft extension 170 to sense movements of the motor housing 166 and provide a signal representative of the angular position of the motor stator. Telescopically received over the leftward end of the shaft extension 170 is a bushing 174 mounting for rotation with the shaft extension 170 a plurality of magnets 176. A coiled restraining spring 178 is arranged about the bushing 174 between the magnet 176 and the motor 164, with the inner end of the spring attached to the bushing and with the outer end of the spring fixed to a spring clamp 180 carried by the fixed casing 158. Supported intermediate the magnets 176 and spring 178 is a magnetically insulating shield 182 to shield the spring from the magnets 176. A bushing 184 of electrically insulating material is telescopically engaged over the rightward end of the shaft extension 170 and is provided with a plurality of radially extending circumferential ribs which are axially spaced to accommodate a plurality of spiral leads such as at 186 for connecting the motor 164 to leads 188 extending from the spirals 186 through a conduit 190 to an electrical connector 192 on the casing 150. The conduit 190 also carries the leads from the pickoff 173 to the connector 192. As will be apparent from the above description and the accompanying FIG. 6, the casing 158 is maintained fluid tight so as to preclude entrance of any of the fluid into the casing and contact with the motor and other equipment therein.

Disposed concentrically about the fixed casing 158 is a deflectable casing or member 194 supported at its opposite ends on bearings, the inner races of which are mounted on the shaft extensions 160, 162 of the fixed casing 158. The deflectable casing 194 carries adjacent its rightward end a plurality of magnets 196 cooperating with the magnets 176 on the shaft extension 170 of the motor housing 166 to tend to deflect the motor housing 166 in response to deflection of the deflectable casing 194. Telescopically received over and coaxially of the deflectable casing 194 is an impeller 198 rotatably supported by bearings 200, 202, the inner races of which are carried by the deflectable housing 194. The impeller carries a plurality of magnets 204 cooperating with a plurality of magnets 206 carried by a drive shaft 208 of the motor 164, so that energizing of the motor with corresponding rotation of the magnets 206 disposed within the casing 158 will effect rotation of the impeller. The impeller is constructed in a manner similar to the structure previously described so as to provide a plurality of circularly arranged linear elongated flow passages 210 disposed concentrically within the housing 150 and extending parallel to the axis of the impeller. A cylindrical shroud 212 is disposed coaxially about the impeller in closely spaced relation to the outer wall of the impeller and the inner wall of the housing 150. The shroud 212 is supported at one end in cantilever fashion by a plurality of struts 214 extending radially inwardly of the shroud and fixedly supported at their inner ends on the deflectable casing 194.

The over-all operation of the flowmeter of FIG. 6 is generally similar to that of the flowmeter described, whereby the impeller will angularly accelerate fluid introduced through either end of the flowmeter to impart an angular momentum to the fluid about the axis of the impeller. The friction error torques of the impeller caused by the bearings 200, 202 will be reflected directly back to the deflectable casing 194 in the same direction as impeller rotation. Correspondingly, viscous error torques on the impeller will be reflected by the shroud 212 directly back to the deflectable casing 194 in the same direction as impeller rotation. Accordingly, the deflectable casing 194 will tend to be rotated by these error torques in the same direction as impeller rotation. The magnetic coupling of the deflectable casing to the shaft extension 170 of the motor housing 166 will transmit the error torque from the deflectable casing 194 to the motor housing 166 to tend to rotate the same in the direction of impeller rotation, with the torque being proportional to the error torques. The reaction torque on the motor housing 166 due to rotation of the impeller 210 will tend to rotate the motor housing in a direction opposite that of the deflectable casing 194 and, of course, in an amount proportional to the total torque applied to the impeller. Accordingly, the resultant deflection of the motor housing will not include the error torques caused by friction and viscous shear forces on the impeller.

As will be apparent from FIG. 6, the torque on the deflectable casing 194 as a result of the viscous coupling by the impeller and shroud 212 may be of a value somewhat higher than the actual viscous error torque on the impeller due to the difference in radii between the shroud and impeller. Further, as is known, during rotation of an impeller of the type shown in FIG. 6 and also FIGS. 1 and 3, the difference in pressure between the fluid adjacent the inner wall of the impeller and fluid adjacent the outer wall of the impeller induces a circulation of fluid in the direction of the arrows in FIG. 6. This induced movement of the fluid is often referred to as a smoke ring effect, and this smoke ring effect tends to provide a coupling between the impeller and next adjacent flow straighteners, which may introduce an error into the output signal of the flowmeter. Accordingly, it should be noted that the total length of the shroud may be adjusted to compensate for the smoke ring effect and difference in radii between the shroud and impeller so as to eliminate these errors from the output signal. As will be apparent, by adjustment of shroud length, if desired, over- or undercompensation may be provided.

While this invention has been described in terms of the various embodiments specifically shown in the accompanying drawings, it is to be understood that the foregoing description as well as the accompanying drawings are to be taken only in an illustrative sense and are not to be considered as limiting the invention to any of the specific embodiments described and shown. It is further intended that the invention shall be limited only by the appended claims, which claims shall include within their scope all structure logically falling within the language of the claims.

What I claim as new and desire to secure by Letters Patent of the United States is:

1. In a fluid mass flowmeter of the single element type, a housing for conducting a flowing fluid, an impeller within the housing for accelerating fluid flowing through the housing in a direction other than the normal flow path of the fluid through the housing, drive means for the impeller including a reaction member which is subject to a reaction force in one direction which is opposite to the direction of the force applied to the impeller, bearing means mounting the impeller for movement relative to said reaction member and the housing and connected to said reaction member to exert a second force thereon in a direction opposite said one direction which is a function of the frictional resistance to movement of the impeller relative to said member, a viscous error compensating member disposed closely adjacent the impeller to provide a viscous coupling therebetween tending to drive said error compensating member with the impeller, and means connecting said compensating member to the reaction member to exert a third force thereon in a direction opposite said one direction which is a function of the viscous shear effect of moving the impeller through a fluid.

2. A fluid mass flowmeter of the single element angular momentum type comprising a housing for conducting a flowing fluid, a generally cylindrical fluid accelerating impeller within the housing having a plurality of circularly arranged fluid flow passages disposed coaxially of the impeller and extending longitudinally therethrough for the passage of substantially all of a fluid flowing through the housing, drive means for the impeller including a member on which is exerted a reaction torque which is variable with the torque applied to the impeller by said drive means and which reaction torque tends to move said member in one direction, a generally cylindrical viscous error compensating shroud arranged coaxially over the impeller in closely spaced relation to provide a viscous coupling between the impeller and shroud when fluid is disposed therebetween, and means connecting the shroud and the said member to apply to said member in a direction opposite said one direction a torque which is a function of the torque on the shroud resulting from the viscous coupling of the shroud and impeller; bearing means rotatably mounting the impeller and connected to said member to impart thereto in a direction opposite said one direction a torque which is a function of the frictional resistance offered by the bearing means, and means for sensing the net torque exerted on said first mentioned member.

3. A fluid mass flowmeter of the single element angular momentum type comprising a housing for conducting a flowing fluid, a generally cylindrical fluid accelerating impeller within the housing having a plurality of circularly arranged fluid flow passages disposed coaxially of the impeller and extending longitudinally therethrough for the passage of substantially all of a fluid flowing through the housing, drive means for the impeller including a reaction member mounted for resiliently restrained movement in one direction about the axis of the impeller, said reaction member being responsive to the torque imparted to the impeller by said drive means to tend to move the reaction member in said one direction, a generally cylindrical shroud disposed coaxially over the impeller in radially outwardly closely spaced relation to provide a viscous coupling between the shroud and impeller, means connecting the shroud to the reaction member for movement therewith to exert on said reaction member in a direction about its axis opposite said one direction the torque exerted on the shroud by reason of its viscous coupling to the impeller, bearing means connected for movement with said reaction member and rotatably supporting the impeller to provide a torque on said reaction member which is proportional to the friction forces of the bearing means resisting rotation of the impeller and which is in a direction opposite said one direction, and means to sense the deflection of said reaction member.

4. In a fluid mass flowmeter of the single element angular momentum type, a housing having a through passage for conducting flowing fluid, an electric drive motor within the housing including a generally annular stator arranged coaxially of the flow passage in the housing, a rotor for the motor disposed coaxially within the stator and having a plurality of fluid flow passages therethrough for accelerating fluid flowing through the housing in a direction angularly about the rotor axis, a generally cylindrical shroud disposed coaxially over the rotor and in the gap between the stator and rotor, the shroud being in closely spaced relation to the rotor to provide a viscous coupling between the rotor and shroud when fluid is disposed therebetween, means connecting the shroud and stator to impart to the stator the torque imparted to the shroud by reason of the viscous coupling of the shroud to the rotor, bearing means rotatably mounting the rotor and connected to the stator to impart to the stator a torque which is a function of the frictional resistance of the bearing means to impeller rotation, and means to sense the net reaction torque on the stator during energizing of the motor.

5. In a fluid mass flowmeter of the single element angular momentum type, a housing having a through passage for conducting flowing fluid, an electric drive motor within the housing including a generally annular stator arranged coaxially of the flow passage in the housing, means supporting the stator on the housing for resiliently restrained movement in one direction about the axis of the stator, a rotor for the motor disposed coaxially within the stator and having a plurality of fluid flow passages therethrough for accelerating substantially all of a fluid flowing through the housing in a direction opposite said one direction and angularly about the rotor axis, a generally cylindrical shroud disposed coaxially over the rotor and in the gap between the stator and rotor, the shroud being in closely spaced relation to the rotor to provide a viscous coupling between the rotor and shroud when fluid is disposed therebetween, means mounting the shroud for movement with the stator, bearing means rotatably mounting the rotor, said bearing means being connected to said stator to impart thereto, in a direction opposite to said one direction, a torque which is a function of the frictional resistance of said bearing means to rotation of said rotor, and means to sense the deflection of the stator about its axis.

6. In a fluid mass flowmeter of the single element angular momentum type, a housing having a through passage for conducting flowing fluid, an electric drive motor within the housing including a generally annular stator arranged coaxially within the housing, a fluid tight casing for the stator connected to the stator for movement therewith and including a cylindrical inner wall extending coaxially of the stator, support means for the stator casing, means rotatably mounting the support means on the housing for movement of the stator about the axis of the stator, means resiliently resisting movement of the stator casing in one direction about its axis, a rotor for the motor disposed coaxially within the stator and having a plurality of fluid flow passages therethrough for accelerating substantially all of a fluid flowing through the housing in a direction angularly about the rotor axis, the periphery of the rotor being in closely spaced relation to said inner wall to provide a viscous coupling therebetween, bearings for the rotor rotatably supporting the same, means connecting said bearings to said stator casing to impart thereto, in a direction opposite to said one direction, a torque which is a function of the frictional resistance of said bearings to rotation of said rotor, and means to sense deflection of the stator casing.

7. In a fluid mass flowmeter of the angular momentum type, a housing for conducting a flowing fluid, an electric drive motor within the housing including a motor casing and a stator and a rotor, means mounting the motor casing on the housing for resiliently restrained movement in one direction about the axis of the rotor, a generally cylindrical rotatable fluid accelerating impeller arranged about the motor coaxially of said rotor, means drivingly connecting the rotor and impeller, bearings supported by the motor casing rotatably mounting the impeller and arrranged to impart to said motor casing, in a direction opposite to said one direction, a torque which is a function of the frictional resistance of said bearings to rotation of said impeller, a generally cylindrical shroud surrounding the impeller in closely radially spaced relation thereto, means connecting the shroud and motor casing for movement together, and means to sense deflections of the motor casing about the rotor axis.

8. In a fluid mass flowmeter of the angular momentum type, a housing for conducting a flowing fluid, an electric drive motor within the housing including a motor casing and a stator and a rotor, a fluid tight cylindrical member fixed to an enclosing the motor, means mounting the cylindrical member on the housing for resiliently restrained movement in one direction about the rotor axis, a generally cylindrical fluid accelerating rotatable impeller disposed coaxially over said cylindrical member, a magnetic coupling drivngly connecting the rotor and impeller, a generally cylindrical shroud coaxially disposed over the impeller in closely radially spaced relation and in a fluid viscous coupling relation with the impeller, means connecting the shroud and said cylindrical member for movement together, bearings carried by said cylindrical member rotatably mounting the impeller and arranged to impart to said cylindrical member, in a direction opposite to said one direction, a torque which is a function of the frictional resistance of said bearings to rotation of said impeller, and means to sense deflections of the cylindrical member about the rotor axis.

References Cited by the Examiner
UNITED STATES PATENTS

| | | | |
|---|---|---|---|
| 2,814,949 | 12/57 | Bodge | 73—194 |
| 2,940,309 | 6/60 | Karlby | 73—194 |
| 2,943,483 | 7/60 | Benson | 73—194 |
| 3,044,294 | 7/62 | Wilhelm | 73—194 |
| 3,056,291 | 10/62 | Bodge | 73—194 |
| 3,071,000 | 1/63 | Cooper | 73—194 |

RICHARD C. QUEISSER, *Primary Examiner.*
ROBERT L. EVANS, *Examiner.*